United States Patent Office

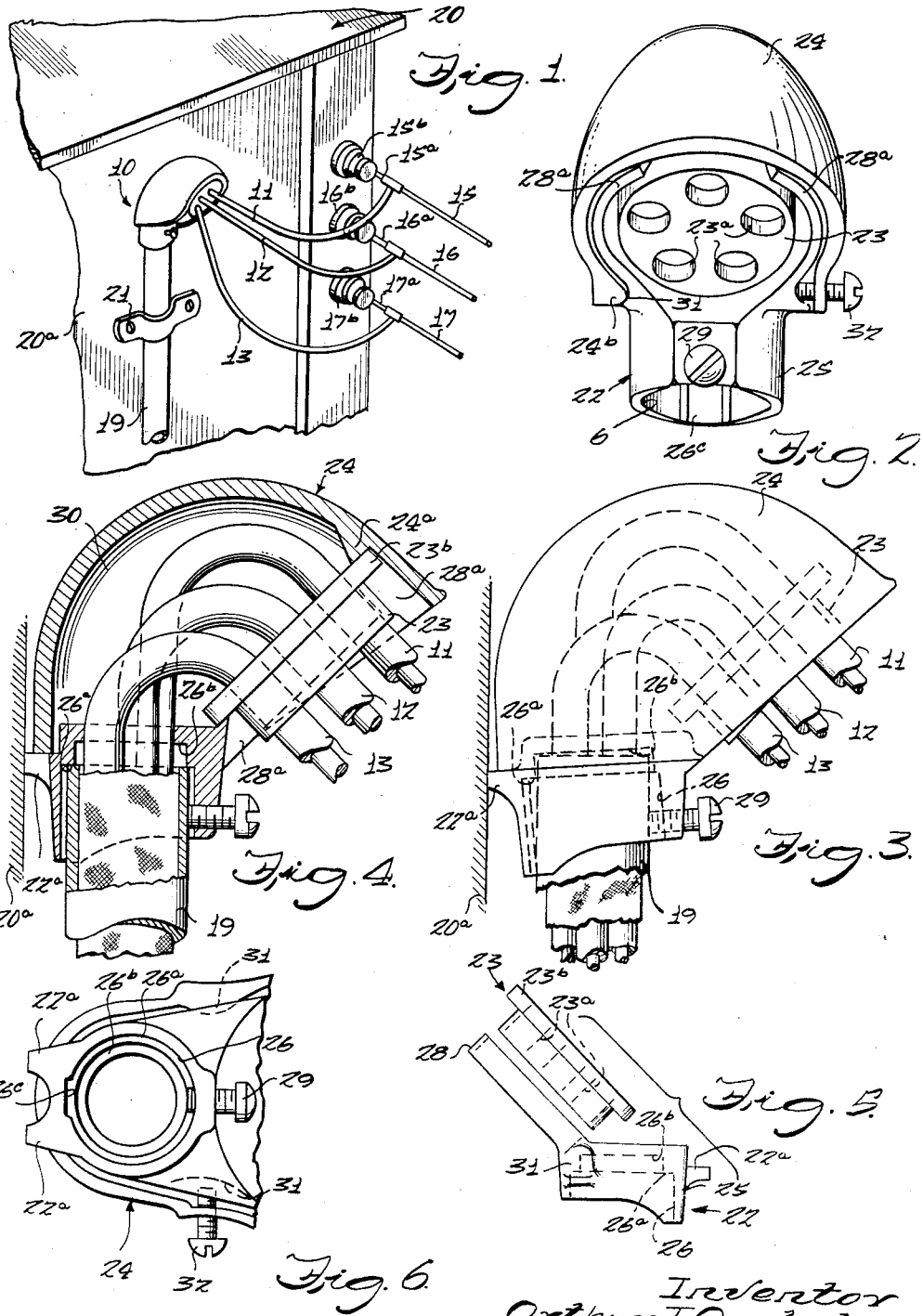

2,908,745
Patented Oct. 13, 1959

2,908,745

SERVICE ENTRANCE FITTING

Arthur I. Appleton, Northbrook, Ill.

Application November 10, 1954, Serial No. 467,928

3 Claims. (Cl. 174—81)

The present invention relates in general to service entrance fittings for leading electrical conductors from overhead power lines into buildings. More particularly, the invention has to do with hooded service entrance fittings which act to prevent the entry of moisture and other foreign material into electric conduits leading conductors downwardly from overhead power lines to the meter and distribution systems of various buildings.

It is the general aim of the invention to provide a greatly simplified yet highly reliable service entrance fitting, for use as noted above, which is characterized by convenience and economy in both manufacture and installation.

More specific objects of the invention are to make possible such a service entrance fitting in which but a single fastener is necessary in order to securely lock the protective bonnet or hood in place on the head; which is readily usable with and accommodates electrical conduits of various diameters; yet which affords the firm retention of such conduits therein upon the tightening of but a single retaining fastener.

Other objects and advantages will become apparent as the following description proceeds, taken in conjunction with the accompanying drawing, in which:

Figure 1 is a perspective view of a part of a building, illustrating a service entrance fitting embodying the features of the invention installed to lead conductors from overhead power lines into a downwardly extending conduit;

Figs. 2 and 3 are front and side elevations of the service entrance fitting;

Fig. 4 is a vertical section of the fitting;

Fig. 5 is an exploded detail view, in side elevation, of the head and separator employed in the service entrance fitting; and Fig. 6 is a bottom view of the fitting with the conduit removed therefrom.

While the invention has been shown and is described in some detail with reference to a particular embodiment thereof, there is no intention that it thus be limited to such detail. On the contrary, it is intended here to cover all modifications, alterations, and equivalents falling within the spirit and scope of the invention as defined by the appended claims.

Referring now to the drawing, the preferred embodiment of the invention has there been illustrated as a hooded service entrance fitting 10 which is shown in a typical wiring installation by Fig. 1, and detailed in Figs. 2–6. As indicated in Fig. 1, the fitting 10 is employed to support and protect electrical conductors 11—13 which extend in slack loops from respective ones of overhead power lines 15—17 downwardly into a metal conduit 19. The latter leads the conductors to the meter and power distribution system (not shown) of a building 20.

In the typical installation illustrated by Fig. 1, the overhead service lines 15—17 lead up to the building from a yard pole (not shown) carrying main power lines, and are anchored by cables 15a—17a made fast to respective anchoring insulators 15b—17b nailed to the upper corner of the building 20. Attaching the metal conduit 19 in vertical position on the outer wall 20a of the building are a plurality of suitable straps 21, the conduit thus presenting its upper end to receive the entrance fitting 10 so as to locate the latter in spaced relation to the service lines 15—17. The sagging or drooping configuration of the conductors 11—13 permits rain and other moisture to drip from the central portions thereof and thus prevents such moisture from running downwardly into the conduit 19.

In the present instance, the entrance fitting 10 comprises a head 22 adapted in a novel manner to be fixed to the upper end of the conduit 19 even though the latter may be of various sizes, to support a conductor-directing separator 23, and to receive a protective hood 24. The head 22 may conveniently and economically be manufactured as a one-piece metal casting and includes a hollow neck portion 25 defining a vertical passage 26. Inclined upwardly from the front corner of the neck 25 is an arm 28 which is adapted to receive and support the separator 23. As here illustrated, the arm 28 is formed by a pair of arcuate projections 28a (Fig. 2) which, although having a space between their opposed extremities, define an inclined circular seat. The separator 23 is preferably constructed of insulating plastic material, having a plurality of apertures 23a therethrough and provided with an upper flange 23b which rests on the projections 28a. By this arrangement, the separator is inclined and serves to hold the conductors 11—13, passed through the apertures 23a, in a smooth reverse bend (Fig. 4) so as to have the drooping loop necessary to afford dripping of moisture.

Structural provision is made such that the head 22 may be removably secured on the upper end of conduits of various sizes simply upon the tightening of a single retaining fastener. For this purpose, the neck portion 25 is so formed that the vertical passage 26, which is preferably round in cross-sectional shape, has a plurality of stepped radial shoulders near its upper end. As here illustrated, the passageway 26 includes a pair of radial shoulders 26a, 26b, these shoulders decreasing in radius toward the upper end of the neck 25. Thus, the lower shoulder 26a has a larger radius and is adapted to receive in abutting relation the upper end of relative large diameter heavy wall conduit (Fig. 4), while the upper shoulder 26b is of smaller radius and adapted to receive in abutting relation the upper end of smaller diameter thin wall conduit (Fig. 3). The circular passage 26 is also formed with a vertical cut-out or channel 26c (Fig. 6) along one side thereof, while a single retaining fastener or screw 29 is threaded through the wall of the neck 25 at a point diametrically opposite the channel.

Thus, it is but a simple matter to rigidly mount the head 22 on the upper end of the conduit 19 simply by inserting the latter into the passage 26 until it axially abuts the shoulder 26a or 26b, depending upon the size of the conduit. This gives a 360° bearing for the end of the conduit as the screw 29 is tightened. Upon tightening of the screw 29, the conduit 19 is clamped in the passage so that it has firm abutting engagement with the edges of the channel 26c. This prevents sidewise "dodging" of the conduit with respect to the retaining screw 29 and assures that the head is firmly fastened to the conduit.

The hood 24 may be formed from a single piece of sheet metal stock which is drawn to have a curved, bonnet-like shape. It is adapted to telescope over the head 22, its rear edge being seated on a pair of tabs 22a which project rearwardly sufficiently to insure that the head is held in spaced relation from the building wall 20a, leaving ample room for the rear lower edge of the hood. The hood also includes an inwardly turned projection 24a which is seated on the upper surface of the separator flange 23b as illustrated best in Fig. 4, thus clamping the separator in place against the converging ends of the arms of the head 22. With the hood so telescoped over the head, it is positioned in covering relation to the neck 22, the conduit 19, and the separator 23, at the same time providing a protected space 30 for the conductors 13—15 in the region where they are bent to extend downwardly into the conduit 19.

The head 22 and hood 24 are constructed in a manner to permit removable locking of the latter on the former upon the tightening of but a single locking fastener. This simplification of structure and convenience of installation is obtained in the present case by the provision of a pair of recesses 31 formed in the head 22 on opposite sides thereof at the juncture of the neck 25 and the arm 28. It is but a simple matter to form these recesses 31 at the time the head 22 is fabricated.

The hood 24 is cooperatively formed with a lug which is automatically inserted into one of the recesses 31 as an incident to telescoping of the hood over the head. As shown best in Fig. 2, in inwardly struck lug 24b is provided on the hood 24 and received in the left recess 31 when the hood 24 is slipped over the head 22. A single fastener in the form of a locking screw 32 is threaded through the opposite side of the hood 24 in proper location to be tightened into the other recess 31. Simply by initially loosening the screw 32, therefore, and slipping the hood 24 down onto the head 22 so that the inwardly struck lug 24b enters the first recess 31, the hood is locked in place upon tightening of the locking screw 32 into the other recess 31. This requires but a few seconds of installation time and greatly reduces the cost of manufacture for the entire service entrance fitting.

The convenience with which the present service entrance fitting may be installed will be apparent from the foregoing description. To briefly summarize, however, the head 22 may be fixed to the upper end of the conduit 19 either before or after the latter is fastened to the outer wall 20a of the building 20 by means of the straps 21. The upper end of the conduit 19 is slipped into the passage 26 of the neck 25 until it axially abuts either the radial shoulder 26a or 26b. Such abutment accurately determines the relative axial position of the head on the conduit and eliminates any need for fine positioning adjustments. When the retaining screw 29 is tightened, the conduit is wedged between the inner end of the screw and the edges of the vertical channel 26c so that the conduit is firmly clamped within the head 22 without any possibility of "dodging" around the screw 29. The conductors 11—13 projecting upwardly from the conduit 19 are then threaded through the apertures 23a of the insulating separator 23, and the latter is seated in nested relation with the inclined arms 28a. As a result, the conductors 11—13 are given a smooth bend just above the upper end of the conduit 19 and extend downwardly in slack loops for connection to the service lines 15—17. After this connection has been made, it is but a simple matter to telescope the hood 24 over the head 22 so that the inwardly struck projection 24b enters one of the recessses 31. Tightening of the locking screw 32 into the other recess 31 locks the hood in place so that the latter covers the head 22 and the upper end of the conduit 19, preventing the entry of moisture and other foreign material into the latter.

The entire service entrance fitting is characterized by simplicity of construction and economy of manufacture. The head 22 with its inclined arm 28 may be conveniently cast as a unitary piece, the recesses 31 being formed at the time of casting. The insulating or plastic separator 23 may likewise be formed by a simple molding process; while the hood 24 may be formed from sheet metal stock as a third unitary piece by a simple drawing or stamping operation.

Only two threaded fasteners, namely, the retaining screw 29 and the locking screw 32, are required. This not only reduces the cost of manufacture but at the same time makes possible quick installation.

I claim:

1. A service entrance fitting comprising, in combination, a head having a vertical, hollow neck and an arcuate arm inclined upwardly from said neck, there being two oppositely disposed recesses in said head at the juncture of said neck and arm, an apertured separator nestingly supported in said arm, a hood shaped to be telescoped over said head in covering relation to said neck and separator, said hood having an inwardly projecting lug insertable into one of said head recesses as an incident to such telescoping, a locking screw threaded through said hood and tightenable into the other of said recesses, the passageway through said hollow neck having a plurality of radial shoulders decreasing in diameter toward the upper end of said neck defining a plurality of regions of successively decreasing diameter and having an axial channel along one side thereof, presenting inwardly facing edges, and a single retaining screw threaded through the neck at a point opposite said channel, whereby the ends of electrical conduits inserted upwardly into said neck and extending into the corresponding size region are rigidly clamped in endwise abutment with one of said shoulders and sidewise abutment with the edges of said channel upon tightening the retaining screw.

2. A service entrance fitting comprising, in combination, a head having a vertical neck with an arm inclined upwardly from the top end of said neck, an apertured separator nested in said arm, a hood removably fixed to said head in covering relation to said neck, arm and separator, said neck having a vertical passageway therethrough relieved along one side thereof to form an axial channel presenting inwardly facing edges and formed with a plurality of radial shoulders decreasing in diameter toward the upper end of said passageway, and a single retaining screw threaded through the side wall of said neck at a point opposite said channel and tightenable to clamp an electrical conduit inserted upwardly into said passageway in sidewise abutment with the edges presented by said channel, the ends of conduits of various diameters abutting against different ones of said radial shoulders to thereby assure a firm clamping action by said retaining screw.

3. A service entrance fitting comprising, in combination, a head having a hollow vertical neck and a pair of arms extending upwardly from said neck and converging at their free ends, an apertured separator nested in said arms and having a portion engaging the upper side of the arms, there being a vertical passageway of generally circular cross section defined through said neck and relieved along one side thereof to form a vertical channel presenting sharply defined inwardly facing corners, and a single retaining screw threaded through the wall of said neck opposite said channel, whereby the ends of electrical conduits inserted into said passageway engage the corners presented by said channel to be held against dodging as said screw is tightened to secure the fitting to the conduit, said apertured separator adapted to receive conductors leading upwardly from the conduit end in said neck, and a hood removably fixed to said head and adapted to cover the conduit end and the conductors leading therefrom through said separator, said hood abutting said separator for holding the portion of the same tight against the upper side of the arms so as to hold the conductors against movement within the fitting.

References Cited in the file of this patent

UNITED STATES PATENTS

| | | |
|---|---|---|
| 939,165 | Potterton | Nov. 2, 1909 |
| 1,647,802 | Josef | Nov. 1, 1927 |
| 1,684,582 | Hoaglund | Sept. 18, 1928 |
| 1,774,357 | Cooper | Aug. 26, 1930 |
| 2,148,059 | Dann | Feb. 21, 1939 |
| 2,362,053 | Danielson | Nov. 7, 1944 |
| 2,404,152 | Weller | July 16, 1946 |
| 2,739,999 | Gill | Mar. 27, 1956 |